Feb. 18, 1930. W. F. GRUPE 1,748,043
RAIN ICE METHOD
Filed Aug. 9, 1927
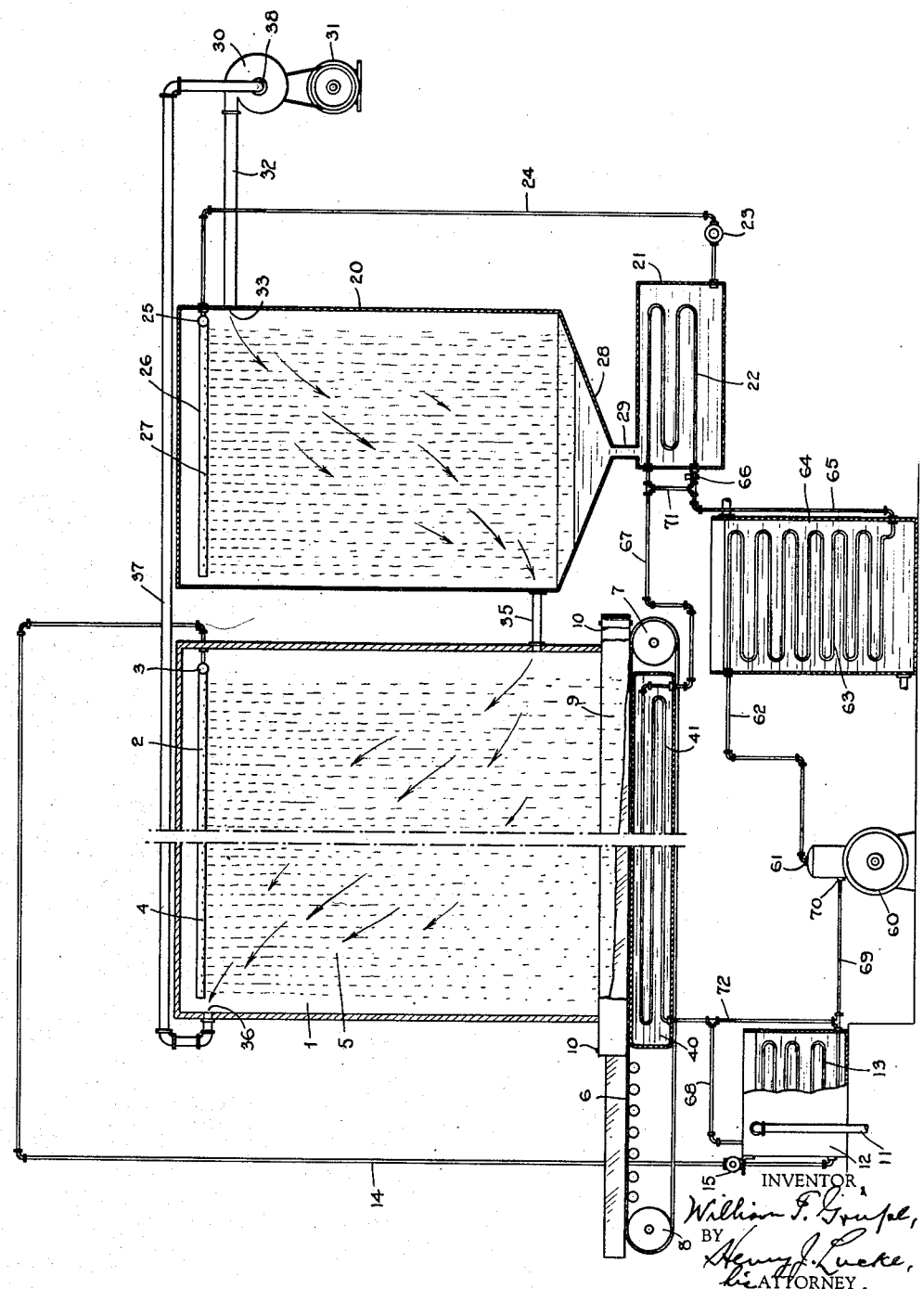
INVENTOR
William F. Grupe,
BY Henry J. Lueke,
his ATTORNEY.

Patented Feb. 18, 1930

1,748,043

UNITED STATES PATENT OFFICE

WILLIAM F. GRUPE, OF RUTHERFORD, NEW JERSEY, ASSIGNOR TO BOUCHER CORK CO., INC., OF NEW YORK, N. Y., A CORPORATION OF NEW YORK

RAIN ICE METHOD

Application filed August 9, 1927. Serial No. 211,674.

The invention relates to apparatus and methods for freezing water or compounds consisting largely of water, such as "ice-cream" or analogous mixtures.

The invention consists, as broadly described, in preliminarily cooling the liquid, causing it to pass in attenuated form, such as drops or spray, through a zone or "atmosphere" of low temperature, and during such passage extracting from it a part of its contained heat, and then congealing the liquid in the form of ice in the case of water, or in more or less solid form, or snow-like crystals, in the case of an ice-cream mixture.

In the practical performance of my invention, referring first to ice production, I preliminarily cool water, preferably to a temperature somewhat above freezing, and discharge this water in attenuated form, preferably substantially as a rain, through a zone or atmosphere of controlled low temperature, whereby the rain is brought nearly to freezing condition by extraction from it of a substantial part of its sensible heat; and the chilled rain then falls upon a receiving body or surface which is maintained substantially below freezing temperature, whereupon the remaining latent heat is extracted and the rain solidifies as ice upon the receiving surface. Freezing of the rain upon contact is facilitated by impact of the drops, which causes them to be forcibly flattened, widely spread and thinned, so that the remaining heat is readily extracted, and the shock of impact moreover aids in the physical readjustment of the liquid which constitutes freezing. The ice body may be built up to any desired thickness by a suitable extent of the zones of precipitation and ice accumulation; after which the ice slab is broken up into any desired block sizes; or if the ice if formed in blocks in individual containers, the blocks may be discharged therefrom by application of moderate heat.

In one specific performance of the process the operations may be substantially as follows, with especial reference to temperature conditions:

The water is preliminarily cooled to approximately 33° F.; the zone or atmosphere through which the water is discharged in divided form may be maintained at or about freezing temperature, or approximately 31° F., and the receiving body or surface is desirably maintained at a temperature well below freezing, say approximately 15° F. While this latter temperature is lower than is necessary for a practical performance of the process, it is desirable in order to insure the production of cold ice; and when a still lower temperature of the product is desired the receiving body may be maintained at a lower temperature.

By this procedure the ice formation is continuous and practically instantaneous without the great time loss involved in chilling water in cans according to known methods. The ice body produced is also perfectly homogeneous and solid and devoid of air bubbles or porous cores, thus avoiding the air pocket or core formations in ice blocks as produced by current methods. The temperature of the ice body is moreover uniform throughout and may be regulated as desired, thus avoiding the present disadvantage of relatively warm ice in the middle of the block, or conversely, avoiding necessity for expressively cooling outer portions of the ice block in order to insure solidification of the interior part.

The invention in practical operation approximately reproduces the natural process of ice formation by deposit of sleet on cold surfaces as commonly observed in winter when a cold rain falls upon colder bodies or surfaces such as trees and sidewalks and congeals upon contact. Considered as a process, the invention consists in operations which are roughly similar to natural processes, but introducing the necessary steps of controlling temperature and other conditions in order to insure definite results, and also introducing important variations from natural conditions or processes, as sufficiently detailed hereafter. Considered as an apparatus the invention consists in providing means for to a certain extent reproducing the natural phenomenon, with control of conditions and variations from natural operations as in the case of the process.

The characteristics and advantages of the invention are further sufficiently explained in connection with the following detail description of the accompanying drawing, which shows a representative embodiment of the invention. After considering this example, skilled persons will understand that many variations may be made within the principles of the invention, and I contemplate the employment of any structures and any performances of the process, that are within the scope of the appended claims.

The drawing is a diagram, in section, of apparatus embodying the invention in one form, and also sufficiently explaining the process.

A principal part of the apparatus as shown in the drawing consists of an enclosure or chamber 1 of any suitable length as indicated by the dot and dash lines *a* representing omission of a central portion of this chamber. In the upper part of the chamber are any suitable plurality of water-spray or "rain" pipes 2, connected to a header 3 and provided with perforations 4 for the discharge of water, preferably in the form of drops, producing in effect a rain 5 descending through the chamber. In a broader aspect of the invention I am not limited as to the size of the water drops or droplets or the exact manner of discharging water through the chamber. It is usually preferred however to discharge the water in the form of drops rather than as a very fine spray, since such drops of substantial size will remain intact until they strike the freezing or receiving surface and will moreover fall vertically without any considerable amount of water striking the vertical walls of the chamber; and thus formation of any considerable amount of ice on the chamber walls is avoided. Especially when the water is discharged in the form of drops, or rain, freezing of the water is avoided until it actually strikes a freezing surface. At the bottom of the chamber is a suitable receiving body or surface, represented in the present specific example by a continuous belt 6 of a suitable metal, usually steel, travelling over pulleys 7 and 8 which are driven in any convenient way, usually at a constant rate. The upper stretch of the belt 6 forms the actual precipitation or freezing surface. To aid in confining the ice sheet or body built up on surface 6, at opposite sides thereof vertical continuous side belts 9 are provided, running on pulleys 10, which are also driven in any convenient way at the same surface speed as belt 6. The receiving means or surface represented by belts 6 and 9 are chilled to a desired temperature, substantially below freezing. For this purpose a brine tank 40 is located close to or in contact with the upper stretch of belt 6, with a refrigerating coil 41 therein.

The water supplied to the rain pipes 2 is pre-cooled to a suitable temperature, which in one specific example is approximately 33°. For this purpose water is supplied from the main 11 to the upper portion of a pre-cooling tank 12, supplied with any convenient means for reducing the water temperature, such for example as refrigerant coil 13 therein. Water is taken from the lower part of the pre-cooling tank through a pipe 14 to a header 3, a pump 15 being provided to elevate the water and supplying the necessary pressure if the pre-cooling tank is located below the spray or rain pipes 2.

The interior of chamber 1 is maintained in any suitable way at a desired temperature for additionally cooling the descending water or rain or maintaining it at proper temperature for congelation upon contact with the receiving surface. In a broad way I refer to the interior of chamber 1 as a zone or "atmosphere" through which the water is precipitated and in which it is properly temperatured for congelation upon contact with the receiving surface. Temperature control of this zone or atmosphere may be obtained by placing refrigerating coils therein and usually by also circulating air through the chamber. Since the location of refrigerating coils in the chamber, or the passage of the cooling air over such coils whether located in the "rain" chamber or a separate chamber, will usually result in the formation of frost thereon extracted from the air, producing an insulating effect which reduces the efficiency of the coils. I usually prefer to provide means external to the rain chamber for cooling air to the desired temperature and for circulating this air through the chamber 1. Such means in the present embodiment of the invention includes an air cooling chamber 20. If refrigerating coils are located directly in this chamber they would be subject to the same disadvantage above mentioned, namely, the deposition thereon of frost extracted from the air. I therefore prefer to cool the air in chamber 20 by passing it through a spray or rain of liquid which does not freeze at or near 32° F., or specifically, a brine. A brine tank 21 preferably located below the bottom of chamber 20 has therein a refrigerating coil 22. Brine is forced from the bottom of tank 21 by a pump 23 through a pipe 24 to a header 25 and a plurality of brine-spray or rain pipes 26 are connected to this header in the upper part of chamber 20. These pipes are provided with perforations 27 to discharge the brine in the form of a spray or rain. The bottom of the chamber has sloping walls forming a sump 28 from which the brine is returned to tank 21 through a pipe 29.

For circulating air through the chambers 1 and 20 any suitable fan or blower 30 is provided, driven by any suitable means such as motor 31. The discharge part of the blower casing is connected by a pipe 32 to one or a plurality of air supply ports 33 in a side wall of chamber 20 somewhat below the brine pipes 26. At the opposite wall of chamber 20 near the bottom thereof any suitable number of pipes 35 discharge air from the chamber into the lower part of chamber 1 at one side or end thereof. The air is discharged from the opposite side of chamber 1 near the top through any suitable number of ports 36 connected by a pipe 37 to the intake of the blower at 38, thus completing a practically closed air circuit.

Details of the refrigerating apparatus proper and refrigerant circuits are sufficiently explained below.

The apparatus described operates as follows:

Air is drawn from the upper part of chamber 1 and supplied to the upper part of chamber 20 through ports 33. Brine cooled to the desired temperature which is in a specific example approximately 28° F., descends from pipes 26 in the form of a spray or rain, and the air passes through this chilled zone or atmosphere in the general course indicated by arrows, and then enters chamber 1 at the front end and near the bottom thereof, and pursues the general course therein indicated by arrows and is discharged through the ports 36. Water issues from the perforations of the pipes 2 and falls through chamber 1 substantially in the form of rain. This water when it issues from pipes 2 is at the temperature of approximately 33° F. as maintained in the pre-cooling tank 12. Additional heat is extracted from the descending water this heat being a large part or substantially all of the sensible heat, since the water is pre-cooled nearly to the freezing point. The water drops then strike the receiving surface 6 which is chilled in the manner above described to a temperature much below 32° F., and the remaining latent heat is thereupon practically instantaneously extracted from the water and it freezes upon the receiving surface, this result being facilitated by its impact with and spreading upon the surface in the manner sufficiently referred to above; and by accumulation of successive drops is built up into a sheet or block 40, the length of course or time of travel of the receiving surface through the rain chamber being arranged or regulated to produce the desired block thickness. This ice formation is dense, uniform and homogeneous without air bubbles or porous cores, and the ice is moreover of uniform low temperature throughout. The ice block or cake proceeds to any desired discharge point at the end of belt 6 and is there cut or broken into blocks of the desired size. Otherwise the belt 6 may be of articulated form and may carry individual cans and ice blocks may be built up in these cans. Such variations are considered immaterial for the purposes of the present invention.

The refrigerating system proper may vary considerably. In the present example, 60 represents a compressor having a discharge port 61 connected by a pipe 62 to a coil 63 in a condenser 64, to which cooling water is supplied as usual. From the condenser coil a pipe 65 leads to an expansion valve 66, and this is connected to coil 22 in brine tank 21. The discharge end of coil 22 is connected by pipe 67 to coil 41 in the belt cooling brine tank 40, and the discharge end of this coil is connected by a pipe 68 to one end of the coil 13 in the water pre-cooling tank 12. The discharge end of this coil is connected by a pipe 69 to intake port 70 of the compressor. Any suitable by-passes may be provided for direct supply of refrigerant to the different coils and also for return of heated refrigerant direct to the compressor without passing through other coils, such arrangements being sufficiently indicated by a pipe 71 by-passing refrigerant directly from pipe 65 to coil 41, and by a return by-pass pipe 72 for by-passing partially heated refrigerant from coil 41 directly to the compressor, valves being provided at every necessary point for proper control of the refrigerant as sufficiently indicated, and as understood by skilled persons without detailed explanation.

Heat economy is provided by preferably utilizing refrigerant which has been partially heated in other coils, for example in the brine tank coil, and belt cooling coil, (either or both) for supply to the coil 13 in the water pre-cooling tank 12 and if cooling effect thus obtained is not sufficient refrigerant may be supplied directly to coil 13 in necessary quantity. Also, a series of pre-cooling tanks may be provided when necessary, the operative principle being sufficiently represented by the singe pre-cooling tank shown.

In the "freezing" of other liquid compounds consisting largely of water, such as ice cream mixtures, the process may be the same as, or similar to that employed in ice production, with variations in certain cases, examples of which are given below. When the process is controlled so that solidification occurs only upon contact of the liquid with the receiving surface, in the case of certain mixtures differing largely in physical character from water, or even including ingredients which are of solid rather than liquid character, the congealed body will not be so dense as pure-water-ice and may subsequently be mixed or otherwise worked or packed in any desired manner, as for instance in cans for storage or shipment. Otherwise the process may be so controlled that when the liquid mixture is discharged from pipes such as 2 in the form of drops of substantial size, or as above described in connection with ice production in the form of a rain, the temperature in the zone or atmosphere of chamber 1 may be maintained low enough to complete freezing of these drops prior to contact with the receiving surface. In such case all of the latent heat is extracted from the liquid during its descent and the receiving surface need not be maintained at a temperature low enough to produce final solidification but only low enough to maintain the frozen globules in solid condition until they are further treated or disposed of. The product in this instance prior to any subsequent working will be in the form of more or less solid globules depending upon the physical characteristics of the liquid mixture.

Another desirable variation of the process consists in discharging the liquid mixture through small apertures such as spray or atomizing nozzles in pipes 2 to produce a mist or spray in the low temperature chamber 1, rather than a rain of larger drops. In this case the cooled zone or atmosphere may be so regulated as to extract most of the latent heat from the spray or mist as it falls but to avoid actual freezing until the liquid strikes the receiving surface whereupon it is frozen in relatively fine particles; otherwise the "atmosphere" may be maintained at a temperature low enough to complete freezing of the spray or mist during its descent, producing relatively fine crystals or a "snow", which is collected and carried off by the receiving surface and may subsequently be stirred, mixed, or otherwise worked and packed to produce a final product of desired consistency or solidity.

In carrying out the process in the ways last described in connection with an ice cream mixture or the like, I provide an edible delicacy of novel form, namely an ice cream or "ice" of relatively light body or consistency, composed of relatively small snow-like crystals; or as conveniently described, a snow-ice-cream; and evidently the solidity of the material may be increased when desired to practically any desired extent by stirring and packing under pressure.

I claim:

1. A process of congealing liquid material consisting largely of water, comprising pre-cooling the liquid, discharging it in divided form in a congealing chamber, cooling a liquid which freezes at a temperature lower than 32° F., passing said liquid in divided form through an air cooling chamber, passing air through the air cooling chamber whereby it is cooled by the cooling liquid, and passing the cooled air through the congealing chamber whereby heat is extracted from the liquid therein.

2. A process of freezing liquids comprising cooling the liquid to a point slightly above freezing, causing the cooled liquid to pass in divided form through a zone which is cooled to approximately 32° F. and during such passage extracting from the liquid a large part of its sensible heat, and collecting the liquid upon a surface which is maintained below 32° F., whereupon remaining latent heat is extracted from the liquid and it congeals in a homogeneous mass.

3. A process of producing ice comprising cooling water to a point slightly above freezing, causing it to fall in a rain through an atmosphere which is cooled to approximately 33° F. and during such descent extracting from it a part of its sensible heat, and collecting the chilled drops on a continuoulsy moving surface which is maintained at a temperature below 32° F. and thereupon extracting the remainder of the latent heat from the water and congealing it in a homogeneous layer.

4. A process of producing ice comprising pre-cooling water, discharging the water in divided form, passing through the water while in such form, chilled air, whereby a part of the sensible heat is extracted from the water, and collecting the cooled drops upon a travelling surface which is maintained at a temperature substantially below 32° F., whereupon the remaining latent heat is extracted from the water and it freezes in a homogeneous dense mass of uniform temperature.

5. A process of producing ice comprising reducing the temperature of an air-cooling liquid, discharging this liquid in divided form, passing air through the liquid whereby the air is chilled, pre-cooling water to approximately 33° F., discharging the water in divided form in contact with the cooled air whereby a large part of the sensible heat is extracted from the water, and collecting the water upon a surface which is at a temperature below 32° F., whereupon the remaining latent heat is extracted and the water is frozen in a solid, homogeneous mass.

6. A process of producing ice comprising pre-cooling water, discharging it in a rain in a substantially closed chamber, cooling air and passing it through the chamber in contact with the rain therein, and moving a receiving surface at the bottom of the chamber, said surface being cooled to below 32° F.

7. A process of producing ice comprising pre-cooling water, discharging it in a rain in a substantially closed chamber, cooling air and passing it through the chamber in contact with the rain therein, and collecting the cooled rain upon a continuously moving surface at the bottom of the chamber, said surface being cooled to below 32° F., whereby remaining latent heat is extracted from the water and it is solidified in a dense, homogeneous mass.

8. A process of producing ice comprising cooling water, causing the water to descend in the form of rain in a substantially closed chamber, moving a cooled receiving surface at the bottom of the chamber, cooling brine, discharging the brine in divided form in an air-cooling chamber, and passing air through said chamber and then through the chamber first mentioned.

9. Congelation apparatus comprising a chamber, means for discharging liquid in divided form through the chamber, receiving means at the bottom of the chamber, means for moving and cooling the receiving means, and means for passing cooled air through the chamber.

10. Congelation apparatus comprising a freezing chamber, a brine chamber, means for discharging liquid in divided form at the top of the freezing chamber, receiving means at the bottom of the chamber, means for discharging chilled brine at the top of the brine chamber, and means for passing air through the brine chamber and then through the freezing chamber.

11. Congelation apparatus comprising a rain chamber, pipes in the upper portion thereof perforated for the discharge of the liquid in divided form through the chamber, a receiving support at the bottom of the chamber, means for moving said support, means for cooling water and supplying it to said pipes, a brine chamber, brine discharge pipes in the upper portion thereof, means for cooling brine and supplying it to said pipes, and means for circulating air successively through said brine chamber and said rain chamber.

12. Congelation apparatus comprising a rain chamber, pipes in the upper portion thereof perforated for the discharge of the liquid in divided form through the chamber, a receiving support at the bottom of the chamber, means for moving said support, means for cooling water and supplying it to said pipes, a brine chamber, brine discharge pipes in the upper portion thereof, means for cooling brine and supplying it to said pipes, and means for circulating air successively through said brine chamber and said rain chamber, and means for collecting and returning brine from the brine chamber to the brine cooling means.

13. Congelation apparatus comprising a rain chamber, a travelling receiver at the bottom thereof, a brine chamber, perforated pipes in upper portions of the respective chambers, means for supplying chilled liquid to the pipes in the rain chamber, means for supplying chilled brine to the pipes in the brine chamber, means for circulating air successively through the brine and rain chambers, and refrigerating mechanism including a compressor, a condenser, and expansion coils for the cooling of the brine and water respectively.

In testimony whereof I have signed this specification this 8th day of August, 1927.

WILLIAM F. GRUPE.